(12) United States Patent
Sponaugle et al.

(10) Patent No.: US 6,865,161 B1
(45) Date of Patent: Mar. 8, 2005

(54) METHOD AND APPARATUS FOR ESTABLISHING A VOICE CALL BY WAY OF AN ELECTRONIC MAIL MESSAGE

(75) Inventors: Jeffrey B. Sponaugle, Hillsboro, OR (US); Kenneth L. Keeler, Hillsboro, OR (US); Ajit Pendse, Portland, OR (US); John R. Kadinger, Porltand, OR (US); Michele S. Rennert, Wilsonville, OR (US)

(73) Assignee: ITXC IP Holdings, S.A.R.L., Luxembourg (LU)

( * ) Notice: Subject to any disclaimer, the term of this patent is extended or adjusted under 35 U.S.C. 154(b) by 478 days.

(21) Appl. No.: 09/694,657

(22) Filed: Oct. 23, 2000

(51) Int. Cl.[7] .......................... H04L 12/18; H04M 3/42
(52) U.S. Cl. .................. 370/261; 370/352; 370/356; 379/88.17; 379/93.24; 379/202.01; 455/416
(58) Field of Search ................................. 370/259, 260, 370/261, 352, 356, 389, 395.1, 395.6, 395.61, 401, 271; 379/88.17, 93.01, 93.07, 93.09, 93.24, 201.01, 202.01, 204.01, 205.01, 93, 21, 202; 345/330; 348/14.08; 455/414, 416; 709/203, 204

(56) References Cited

U.S. PATENT DOCUMENTS

| | | | | |
|---|---|---|---|---|
| 6,175,619 B1 | * | 1/2001 | DeSimone | 379/202.01 |
| 6,272,214 B1 | * | 8/2001 | Jonsson | 379/202.01 |
| 6,275,575 B1 | * | 8/2001 | Wu | 379/202.01 |
| 6,564,261 B1 | * | 5/2003 | Gudjonsson et al. | 709/227 |
| 2001/0026609 A1 | * | 10/2001 | Weinstein et al. | 379/93.01 |

* cited by examiner

Primary Examiner—Alpus H. Hsu
(74) Attorney, Agent, or Firm—Kaplan & Gilman, LLP (57) ABSTRACT

A method and apparatus for establishing a voice call by way of an electronic mail (email) message is provided. According to one embodiment of the invention, a first party (i.e. offeror), generates or causes to be generated, an electronic token representing an offer to participate in a voice which is transmitted to an offeree party in association with an email message. Upon receiving the electronic token, the offeree has the option of accepting the offer by activating the electronic token. When the offeree activates the electronic token, a first voice call is established with the offeree and a second voice call is established with a destination party identified by the offeror. Once the two calls have been established, they are bridged together to place the offeree in voice communication with the destination party. In one embodiment, the destination party is the offeror.

33 Claims, 7 Drawing Sheets

CALL TYPE ✕

SELECT TYPE OF VOICE CALL:

- VOIP TO VOIP ☐
- VOIP TO PSTN ☐
- PSTN TO VOIP ☐
- PSTN TO PSTN ☒

CALLING INFO (VOIP to VOIP) ✕

DESIGNATE OFFEREE
[ 128.256.1.2 ▼ ]

DESIGNATE DESTINATION PARTY
[ Joe Smith ▼ ]

Fig. 3(c)

CALLING INFO (VOIP to PSTN) ✕

DESIGNATE OFFEREE
[ Joe Smith ▼ ]

DESIGNATE DESTINATION PARTY
[ 1-800-555-1234 ▼ ]

Fig. 3(c)

CALLING INFO (PSTN to VOIP)

DESIGNATE OFFEREE
[ JOE SMITH ▼ ]

DESIGNATE DESTINATION PARTY
[ SAM JONES ▼ ]

Fig. 3(d)

CALLING INFO (PSTN to PSTN)

DESIGNATE OFFEREE
[ 408-555-6789 ▼ ]

DESIGNATE DESTINATION PARTY
[ 503-555-2468 ▼ ]

Fig. 3(e)

BILLING INFO

SELECT PAYMENT METHOD
  BILL TO CREDIT CARD ☐
  BILL TO ACCOUNT ☐

ENTER USER NAME
[________________▼]
ENTER PASSWORD
[________________]

ENTER CREDIT CARD NUMBER
[________________]
ENTER EXPIRATION DATE
[JAN▼] [00▼]   [CONTINUE]

```
<Ptt Token>
    <CALLER NAME> John Smith </CALLER NAME>
    <CALL1 TYPE> PSTN </CALL1 TYPE>
    <CALLER PN> 408-555-6789 </Caller PN>
    <CALLEE NAME> Mom & Dad Smith </CALLEE NAME>
    <CALL2 TYPE> PSTN </CALL2 TYPE>
    <CALLEE PN> 503-555-2468 </CALLEE PN>
</Ptt Token>

<Ptt Token>
    <CALLER NAME> John Smith </CALLER NAME>
    <CALL1 TYPE> VOIP </CALL1 TYPE>
    <CALLER IP> 128.256.1.2 </Caller IP>
    <CALLEE NAME> Mom & Dad Smith </CALLEE NAME>
    <CALL2 TYPE> PSTN </CALL2 TYPE>
    <CALLEE PN> 503-555-2468 </CALLEE PN>
</Ptt Token>
```

FIGURE 7

METHOD AND APPARATUS FOR ESTABLISHING A VOICE CALL BY WAY OF AN ELECTRONIC MAIL MESSAGE

FIELD OF THE INVENTION

The invention relates generally to the field of telecommunications and, in particular to a method and apparatus for establishing a voice call by way of an electronic mail message.

BACKGROUND OF THE INVENTION

In recent years, information technology including personal computer, telecommunication, and television technologies have begun to converge, whereby clear demarcations that once separated the various technologies have blurred. This "convergence" may be attributed, at least in part, to the explosive growth of the Internet.

Internet based voice communication is one advance in the telecommunications industry that has been made possible through the growth of the Internet. For example, calls that were once required to be managed by the public switched telephone network (PSTN) that assigns a dedicated communication line or circuit for each user to complete a telephone call, may now be connected through the shared medium of the Internet by breaking the voice data into varying sized packages or "packets," and transmitting them over the shared medium of the Internet.

The Internet Protocol (IP) is a protocol utilized throughout the Internet to interleave and transmit data packets so as to best utilize the available bandwidth at any given time. Voice over IP (VoIP) is a term used to describe a set of services for managing the delivery of voice information using the Internet protocol. Various software products on the market provide VoIP services that enable two parties (e.g., caller and callee) to communicate with each other through the Internet. In order to do so, however, each of the parties to the VoIP call are typically required to communicate through hardware utilizing compatible voice encoders or "CODECs." Although emerging standards such as the International Telecommunication Union's (ITU) H.323 standard attempts to alleviate the CODEC compatibility issue, the parties to the call are nonetheless each required to communicate through a computer system or appliance equipped to place and/or receive VoIP calls. Unfortunately, however, not everyone has access to such VoIP equipped hardware. In fact, given the wide availability of PSTN handsets and their associated ease of use, even those who have access to such VoIP equipped hardware may nonetheless prefer to communicate via the more commonplace PSTN handsets.

U.S. Pat. No. 6,026,087, titled "Method and Apparatus for Establishing a Voice Call to a PSTN Extension for a Networked Client Computer" (having a common assignee with the present application) addresses the need for bridging the Internet and packet based devices with conventional PSTN handsets. Accordingly, a user of a networked computer can place a voice call to a PSTN extension (equipped with merely a conventional handset) rather than being limited to placing a voice call to only VoIP equipped hardware. Although this goes a long way towards integrating the VoIP functionality of the Internet with the PSTN, further integration remains desirable.

SUMMARY OF THE INVENTION

A method and apparatus for establishing a voice call by way of an electronic mail (email) message is provided.

According to one embodiment of the invention, a first party (i.e. offerror), generates, or causes to be generated, an electronic token representing an offer to participate in a voice which is transmitted to an offeree party in association with an email message. Upon receiving the electronic token, the offeree has the option of accepting the offer by activating the electronic token. When the offeree activates the electronic token, a first voice call is established with the offeree and a second voice call is established with a destination party identified by the offeror. Once the two calls have been established, they are bridged together to place the offeree in voice communication with the destination party. In one embodiment, the destination party is the offeror.

BRIEF DESCRIPTION OF THE DRAWINGS

The invention is illustrated by way of example, and not by way of limitation in the figures of the accompanying drawings in which like reference numerals refer to similar elements.

FIGS. 3(a-f) are graphical illustrations, each representing various data input dialogs presented to an offeror in association with generation of one or more the tokens according to one embodiment of the present invention.

DETAILED DESCRIPTION

A method and apparatus for establishing a voice call by way of an electronic mail message is disclosed herein. As will be described in further detail below, a first party (i.e. offeror), generates or causes to be generated, an electronic token representing an offer to an eventual offeree to participate in a voice call. According to one embodiment of the invention, the offeror transmits the electronic token to an offeree in association with an email message. Upon receiving the electronic token, the offeree has the option of accepting the offer by activating the electronic token. According to one embodiment of the invention, when the offeree activates the electronic token, a first voice call is established with the offeree and a second voice call is established with an identified destination party. Once the two calls have been established, they are bridged together to place the offeree in voice communication with the destination party. In one embodiment, the destination party is the offeror.

In the following description, for purposes of explanation, specific numbers, materials and configurations are set forth in order to provide a thorough understanding of the invention. It will be apparent, however, to one skilled in the art that the invention may be practiced without these specific details. In some instances, structures and devices are shown in block diagram form in order to avoid obscuring the invention. In other instances, well known features are omitted or simplified in order not to obscure the present invention. For ease of understanding, certain method steps are delineated as separate steps; however, these separately delineated steps should not be construed as necessarily order dependent in their performance. Furthermore, reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
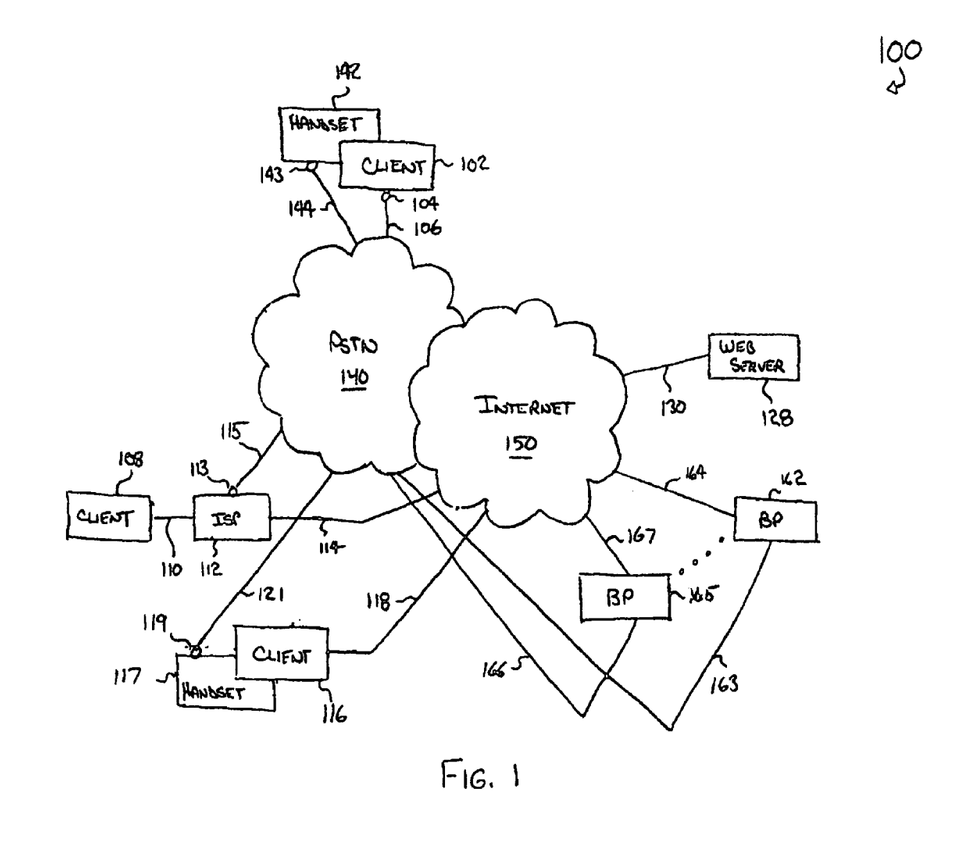
FIG. 1 is a block diagram illustrating an exemplary communication system incorporating the teachings of the present invention.

In FIG. 1, a block diagram is presented illustrating an exemplary communication system 100 incorporating the teachings of the present invention. While the present invention will be described in the context of this exemplary communication system, based on the descriptions to follow, those skilled in the art will appreciate that the present invention is not limited to this embodiment. Referring now to FIG. 1, client computers 102, 108 and 116, handsets 142 and 117, web server 128, and bridgeports 162 and 165 are communicatively coupled to each other by way of PSTN 140 and Internet 150 as shown.

Figure 6:
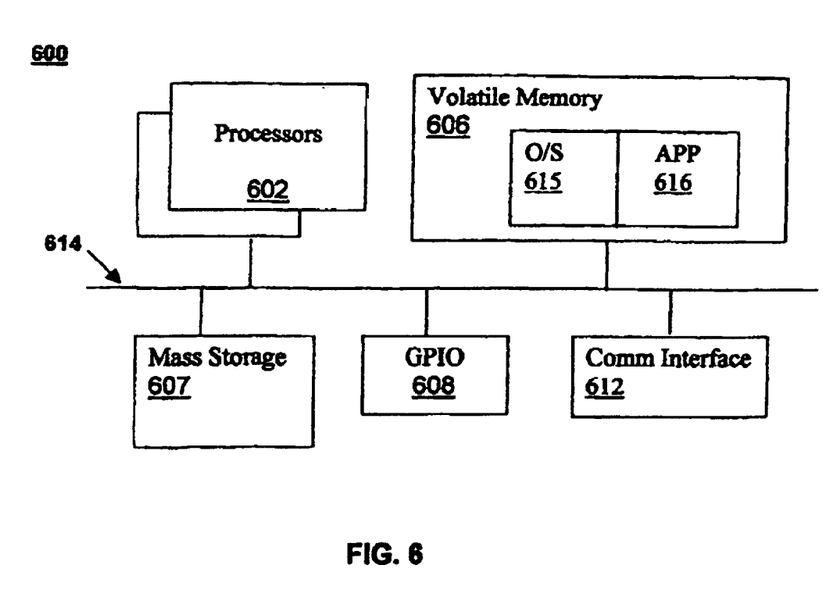
FIG. 6 illustrates an example computer system suitable for use as a web server and/or one or more of client computers incorporating the teachings of the present invention.

Except for the teachings of the present invention (to be more fully described below), client computers 102, 108 and 116 are intended to represent a broad category of Internet telephony enabled computer systems known in the art. FIG. 6 illustrates an example computer system suitable for use as one or more of client computers 102, 108 and 116 and/or web server 128. As shown, system 600 includes one or more processors 602, such as a PENTIUM™ processor manufactured by Intel Corporation of Santa Clara, Calif.; System memory 606, including both operating system 615, such as WINDOWS™ 95, 98, or 2000 with internetworking communication and socket services, and one or more applications 616; Mass storage devices 607, such as a diskette drive, hard drive, CDROM and so forth; GPIO 608 for interfacing with I/O devices such as a keyboard and cursor control devices, and for inputting, digitizing and compressing outbound audio, and for decompressing and rendering inbound audio; and Communication interfaces 612, such as MODEMs, network interface cards, and so forth for sending and receiving various data packets (including audio data packets) in accordance with certain standard communication protocols. The elements of system 600 are coupled to each other via system bus 614, which may represent multiple buses bridged by one or more bus bridges (not shown). Each of the elements of system 600 performs its conventional functions known in the art. In particular, system memory 604 and mass storage 606 are employed to store a working copy and a permanent copy of the programming instructions implementing the token generation and/or call placement services of the present invention. Except for the teachings of the present invention, the constitution of the elements shown in FIG. 6 is known, and accordingly will not be further described.

As illustrated in FIG. 1, client computer 102 is coupled to ISP 112 through PSTN extension 104, communication line 106, PSTN 140, communication line 115, and PSTN extension 113. In turn, ISP 112 is coupled to Internet 150 by direct connection 114. Client computer 102 is equipped to communicate with ISP 112 through, for example, a modulation/demodulation (MODEM) device (not shown) coupled to PSTN extension 104, while client 108 is equipped with a network interface to communicate with ISP 112 through network connection 110. Rather than being connected to ISP 112, client computer 116 is directly coupled to Internet 150 using direct connection 118. Each of client computers 102, 108 and 116 represent a general purpose computer equipped to communicate with Internet 150 accordingly. It should be noted, however, that the various connections between client computers 102, 108, and 116, and PSTN 140 and Internet 150 described above, are merely illustrative and may vary from that which is described. For example, instead of being directly coupled to Internet 150, client computer 116 may be connected to Internet 150 through ISP 112 without departing from the spirit and scope of the invention.

Handsets 142 and 117 are intended to represent a broad category of conventional telephone handsets known in the art, including but not limited to desktop handsets, cordless handsets and wireless handsets. Handset 142 is coupled to PSTN 140 through PSTN extension 143 and communication line 144, while handset 117 is coupled to PSTN 140 through PSTN extension 119 and communication line 121. Communication lines 106, 144, 115, and 121 may simply be plain old telephone service (POTS) communication lines, although other types of communication lines may be used. For example, in the case of communication line 106, it may be an integrated service digital network (ISDN) line, whereas in the case of communication line 115, it may be a T1 (1.533 Mbps) or an E1 (2.0488 Mbps) trunk line. Each of communication lines 144 and 121 may be a wireless cellular connection, a Personal Communication Services (PCS) connection, and the like.

PSTN 140 includes a number of Service Switching Points (SSP), Signal Transfer Points (STP), and Service Control Points (SCP) coupled to each other (not shown). PSTN extension 104 is coupled through communication line 106 to a "local" SSP, which in turn is coupled to a number of other "local" PSTN extensions, including for example, PSTN extension 113 if ISP 112 is a "local" ISP served by the same SSP. In addition, the "local" SSP is also coupled to an associated STP, which in turn is coupled to other "remote" SSPs. Each of the "remote" SSPs is coupled to a number of "remote" PSTN extensions, including for example, extension 119 if handset 117 is a "remote" handset served by a "remote" SSP. As is well known in the art, Internet 150 includes a number of networks interconnected by routers, interconnecting the various client computers, web servers and bridgeports together.

Bridgeports 162 and 165 are coupled to Internet 150 through connections 164 and 167 respectively, and to PSTN 140 through communication lines 163 and 166 respectively. Each of bridgeports 162 and 165 represent a server to determine an appropriate destination PSTN extension, such as the PSTN extension of telephone handset 117 for example, as well as an appropriate one of the community of Internet/PSTN changeover servers (e.g., bridgeports 162 and 165) to place a voice call to a PSTN extension and facilitate the voice call between a user of client computer 102 or 108, for example, and the user of a PSTN endpoint, such as handset 117. In one embodiment, bridgeports 162 and 165 facilitate establishment of a voice call between two PSTN extensions in response to an offeree activating the electronic token of the present invention. In an alternative embodiment, in addition to facilitating establishment of a voice call between two PSTN extensions, at least one of bridgeports 162 and 165 additionally operate to generate the electronic token of the present invention, i.e. serving also as web server 128. Further details regarding the functionality of bridgeports 162 and 165 may be found in U.S. Pat. No. 5,889,774, titled "Method and Apparatus for Selecting an Internet/PSTN Changeover Server for a Packet Based Phone Call" (having a common assignee with the present application), which is hereby incorporated by reference.

Web server 128 is coupled to Internet 150 through connection 130, but may also be coupled to PSTN 140 by way of additional connections (not illustrated). In one embodiment, web server 128 is a corporate presence web server equipped to generate the electronic token of the present invention. In one embodiment, web server 128 generates the electronic token based at least in part upon data provided to web server 128 by, for example, client computer 102. In an alternative embodiment, in addition to generating the electronic token of the present invention, web server 128 further facilitates establishment of a voice call between two PSTN extensions in response to an offeree activating the electronic token, i.e. serving also as one of the bridgeports. For the purposes of this disclosure, any client that generates the electronic token of the present invention, or causes such a token to be generated, will be referred to as an offeror, whereas any client that receives the electronic token representing an offer to participate in a voice call will be referred to as an offeree.

In one embodiment, web server 128 generates the electronic token in association with a contractual relationship previously established between the user of client computer 102 and the third party business entity that owns and/or operates web server 128. Depending upon the contractual relationship that may exist between the third party operator of web server 128 and an offeror, such as the user of client computer 102 for example, web server 128 may provide the token generation and call connection services of the present invention to the offeror in exchange for payment of a fee to the operator of web server 128 by the offeror. In one embodiment of the invention, the offeror is charged a subscription-based fee, whereby the offeror may make unlimited use of the services provided by the third party within a specified time period. In an alternative embodiment, the offeror is charged a "per use" fee, whereby the offeror is charged a fee each time the offeror utilizes the third party services of the present invention.

For example, assume the user of client computer 102 has entered into a subscription based contractual relationship with a third party business entity that owns and operates web server 128. In exchange for paying a determined sum of money to the third party, the user of client computer 102 is permitted to cause web server 128 to generate an unlimited number of electronic tokens, each representing an offer to participate in a voice call. Further assume, as described earlier, that client computer 102 is communicatively coupled to web server 128 through PSTN 140, ISP 112 and Internet 150. In order to cause web server 128 to generate an electronic token representing an offer to participate in a voice call, client computer 102 would first establish a communication session with web server 128 using, for example, a predetermined username and password. Once web server 128 has authenticated the identity of client computer 102, client computer 102 is provided access to standard and/or custom electronic token generation web pages of web server 128. In one embodiment, client computer 102 is presented with web pages including user-specific data such as user account information, billing information, and personal address book information, for example.

Figure 7:
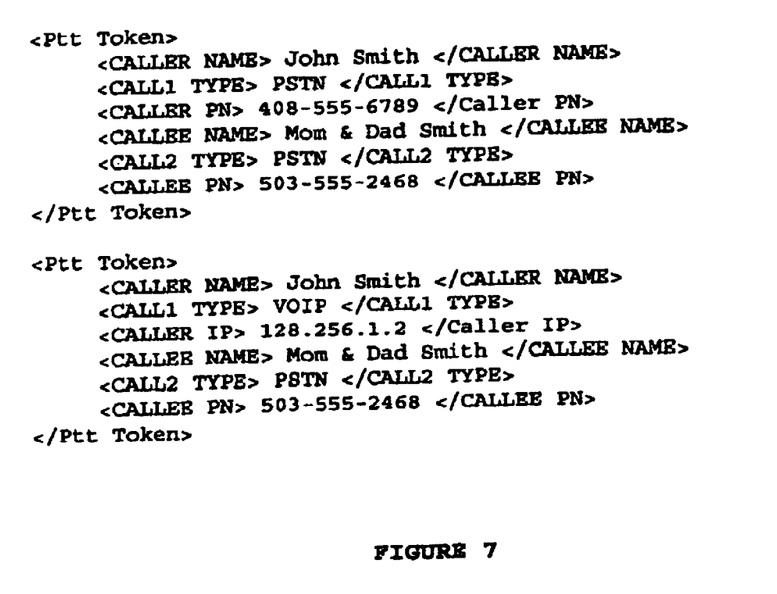
FIG. 7 illustrates two exemplary XML data structures each representing an electronic token according to one embodiment of the present invention.

Each electronic token may contain various amounts of contact information. In one embodiment, the electronic token is self-describing in that it has encoded within it, all contact information necessary to facilitate a call between two parties, such as a caller (i.e. offeree) and a callee (i.e. destination party). Such contact information may include PSTN identifiers and/or IP addresses of the caller, the callee, and the bridgeport used to bridge the two calls. In the case of a self-describing electronic token, the bridgeport need not be notified of the electronic token's existence except upon the electronic token becoming activated. In an alternative embodiment, the electronic token has encoded within itself less than all necessary contact information. For example, in a minimal implementation, the electronic token may only include a bridgeport address and a call identifier identifying the call to be established. The bridgeport, whose address is encoded within the electronic token, stores the remaining contact information in association with the call identifier. When the electronic token is activated, the identified bridgeport is contacted and the bridgeport performs a lookup to correlate the stored contact information with the call identifier. By not including all contact information within the electronic token, the token may be used for anonymous communication. In one embodiment of the invention, the electronic token is implemented as an extended markup language (XML) data structure, however, the electronic token may also be implemented as a hypertext markup language (HTML) data structure, and a standard generalized markup language (SGML) data structure. In other embodiments, other programming languages may be used. FIG. 7 illustrates two exemplary XML data structures each representing an electronic token according to one embodiment of the present invention.

Figure 2:
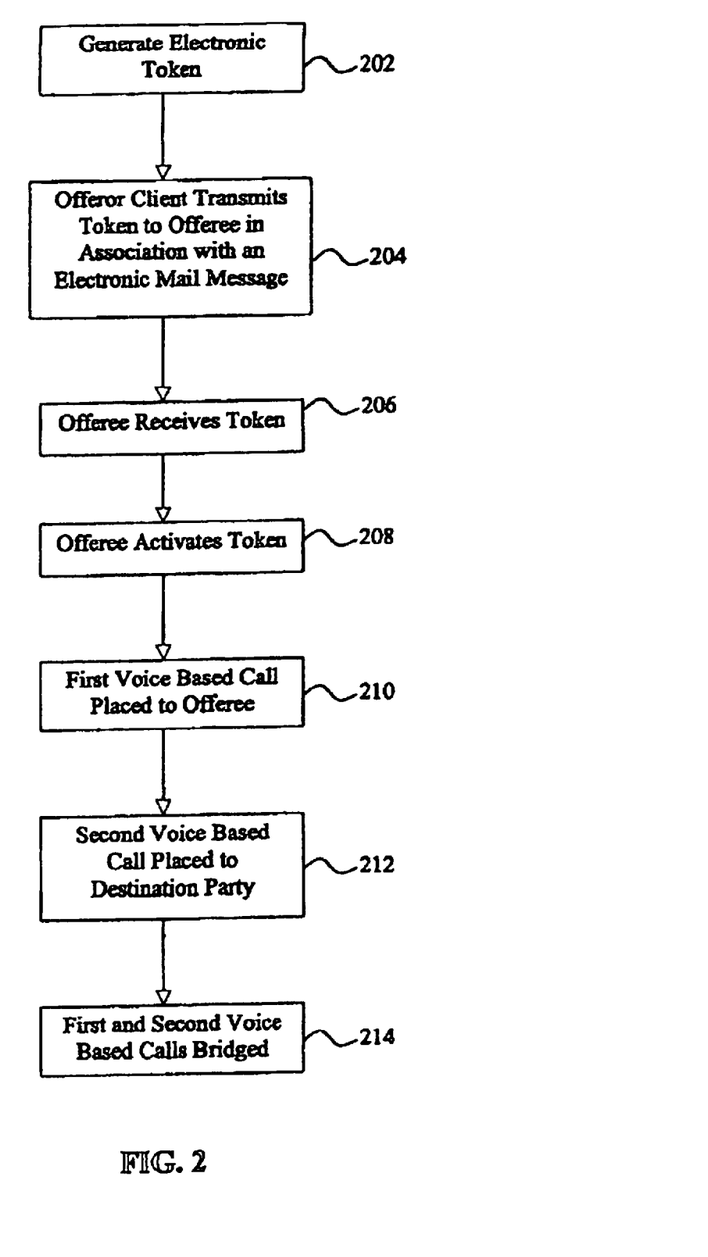
FIG. 2 is a flow diagram illustrating one embodiment of a method for establishing a voice communication session between two parties by way of an electronic mail message.

FIG. 2 is a flow diagram illustrating one embodiment of a method for establishing a voice communication session between two parties by way of an electronic token of the present invention. In accordance with illustrated embodiment, an offeror (i.e., client computer 102) causes web server 128 to generate an electronic token representing an offer to participate in a voice call (block 202). In an alternative embodiment, client 102 includes programming instructions that when executed, cause client computer 102 to generate the electronic token. Once the token representing the offer to participate in a voice call has been generated, the offeror such as client computer 102 transmits the generated token to an offeree such as client computer 116, in association with an electronic mail message (block 204). Upon receiving the electronic token from the offeror (block 206), the offeree activates the token by, for example, selecting a graphical icon representing the token with a user input device such as a mouse (block 208). Upon activation of the electronic token, a bridgeport designated by the electronic token is contacted. In one embodiment, the contacted bridgeport places a first voice call to the designated offeree (block 210), and places a second voice call to the designated destination party (block 212). In an alternative embodiment, as described in U.S. Pat. No. 5,889,774 incorporated by reference above, the contacted bridgeport is one of a community of bridgeports (i.e. bridgeports 162 and 165) that determine among themselves how best to complete the first and second calls. Once the respective voice calls have been placed to the designated offeree and destination party, the calls are bridged by, for example at least one of bridgeports 162 and 165, so as to place the designated offeree and destination party in voice communication with each other (block 214). In one embodiment, the designated party is the offeror, however, the offeror need not necessarily be the destination party.

For example, a mother and father could generate or cause to have generated an electronic token that they would transmit in association with an electronic mail message to their child who is away at college. Upon receiving the electronic token, either embedded within or attached to an email message from the parents, the child could activate the token by, for example, selecting a graphical representation of the token with a computer mouse. Upon activating the token, a first voice call would be placed from a bridgeport (e.g., bridgeport 162 and/or 165) to the child, and a second voice call would be placed from a bridgeport (e.g., bridgeport 162 and/or 165) to the parents. Thereafter, the two calls would be bridged to place the parents and the child in voice communication with one another.

Figure 3A:
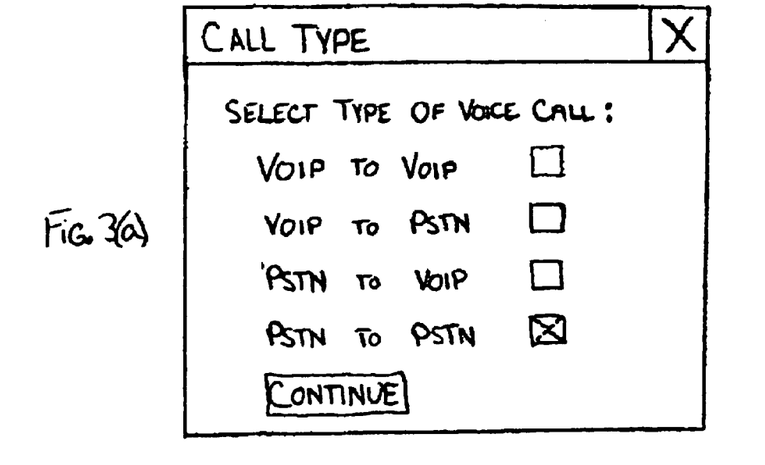
Figure 3B:
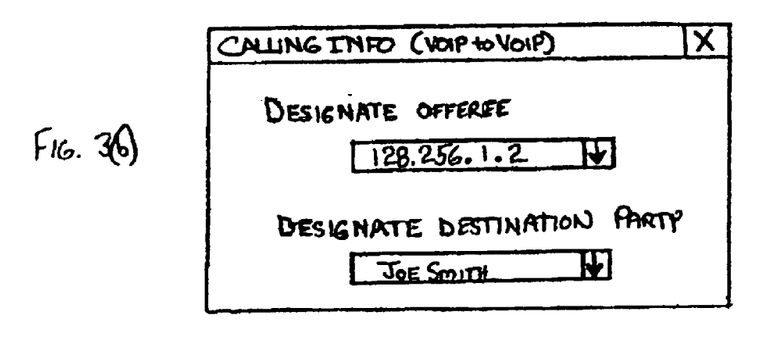
Figure 3C:
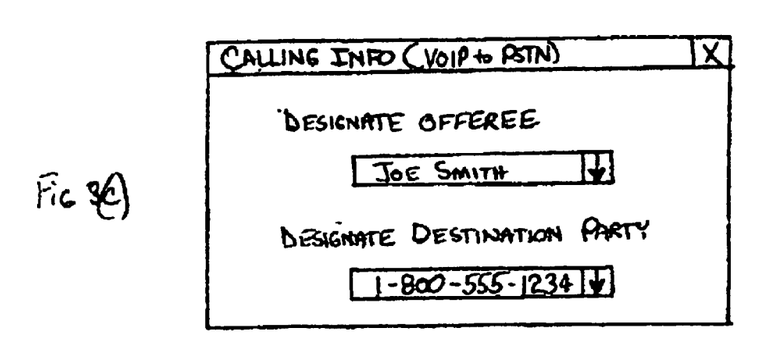
Figure 3D:
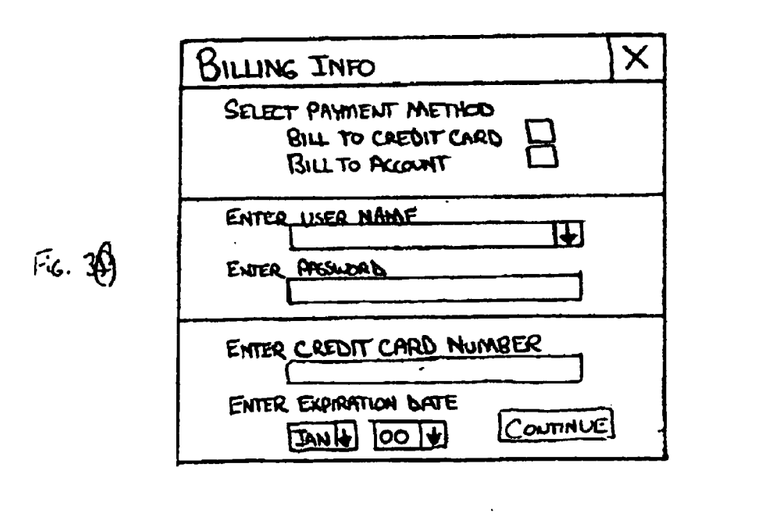

In accordance with one embodiment of the invention, the electronic token is generated based at least in part upon data supplied by the offeror. FIGS. 3(*a–f*) are graphical illustrations, each representing various data input dialogs presented to an offeror in association with generation of one or more the tokens according to one embodiment of the present invention. The dialogs may be generated by a web server, such as web server 128, or be generated by a local application executing on a client computer, such as client computer 102. If a web server generates the dialogs, the dialogs may be displayed as part of one or more web pages transmitted to the offeror via the hypertext transfer protocol (HTTP), for example. If the dialogs are generated by a locally executing application, however, the dialogs may appear as one or more windows upon the offeror's desktop and may be accessible to the offeror through one or more menu selections or buttons upon the offerors desktop.

FIG. 3(*a*) represents one embodiment of a "call-type" data input dialog in which an offeror may select the type of voice call to be placed upon activation of the electronic token by an offeree. According to the illustrated embodiment, an offeror may choose to have the electronic token represent a VoIP-to-VoIP call, a VoIP-to-PSTN call, a PSTN-to-VoIP call, or a PSTN-to-PSTN call. By selecting the VoIP-to-VoIP call option, for example, the offeror indicates that VoIP based calls should be placed to both the offeree and the destination party, whereas by selecting the VoIP-to-PSTN call option, the offeror indicates that a VoIP based call should be placed to the offeree and a PSTN based call-should be placed to the destination party. Similarly, the PSTN-to-VoIP call option places a first PSTN based call to the offeree and a second VoIP based call to the destination party, whereas the PSTN-to-PSTN call option places first and second PSTN based calls to both the offeree and the destination party. In the illustrated embodiment, each of the call selections correspond to a check box, however, radio buttons, image maps and other graphical and text based selection methods known in the art may likewise be used.

FIGS. 3(*b–e*) each represent an embodiment of a data input dialog for an offeror to designate an offeree and a destination party to be placed in voice communication with each other. In each of FIGS. 3(*b–e*) the offeror is presented with a first drop-down selection list for designating an offeree and a second drop-own selection list for designating a destination party. Although drop-down lists are shown, other data entry techniques known in the art may be utilized. Depending upon the type of call selected (e.g. through the dialog of FIG. 3*a*), the offeror may designate an offeree and a destination party by name, IP address, and/or PSTN extension. For example, in FIG. 3*b*, the offeree is designated by IP address, whereas in FIG. 3*e*, the offeree is designated by a PSTN identifier (i.e. telephone number). Some or all of the designation information, such as destination party name, IP address, and phone number may be retained in and accessed from a private/public address book of the offeror client.

FIG. 3*f* represents one embodiment of a "billing" data input dialog in which an offeror may enter billing-specific data to facilitate payment of a fee to a third party. The offeror may, for example, select to pay for the services provided by the third party by way a credit card, or the offeror may choose to have the fee billed the offeror's preexisting account. If the offeror selects to pay using a credit card, the offeror's ability to pay for such services is verified by an independent credit agency prior to generation of the token or call placement. In one embodiment, the offeror may choose to have the cost of the electronic token generation and/or call placement services billed to the offeree. Conceptually, this may function much like a "1-900" number, wherein a caller pays a fee to a service provider in order to receive some phone-based service. In this example, the offeror would function as both the service provider and the destination party. In one embodiment, the token is distributed to the offeree by way of solicited or unsolicited email from an advertising or telemarketing offeror. Upon activating the electronic token, the offeree may be presented with various billing options, such as those illustrated in FIG. 3*f*.

As alluded to previously, the electronic token generation and call placement services of the present invention may also be used to provide anonymous voice communication between an offeree and a destination party, wherein neither of the parties to the call have knowledge of the other's identity. For example, an Internet dating service could provide the electronic token generation service of the present invention. A user of the dating service would log into a web server, such as web server 128, and browse through one or more web pages linked to a database to provide the user with various levels of information related to individuals the user may wish to date. Once the user selects one of the potential candidates from the database, web server 128 would generate the electronic token using obfuscated or encrypted code in place of each user's personal contact information, such as PSTN extension or IP number for example. The dating service would then email the generated electronic token to the selected offeree.

Once the offeree receives the electronic token representing an offer to participate in a voice call with the offeror, the offeree may activate the token to be placed in voice communication with the offeror. In one embodiment, activating the electronic token causes an HTTP post to be transmitted to a remote server, such as web server 128 or bridgeport 162 or 167, which recognizes this as a token activation by the offeree. The remote server then performs a lookup in a database to correlate the contact information with the appropriate PSTN and/or IP connection information. In one embodiment, the remote server (e.g., web server 128) uses this connection information to place the offeree and destination party in voice communication with one another, whereas in another embodiment, remote server forwards this connection information to another server (e.g., bridgeports 162 and 165) to place the offeree and destination party in voice communication with one another. Nevertheless, the identity of the offeree and the offeror/destination party are not revealed to either party.

Figure 4:
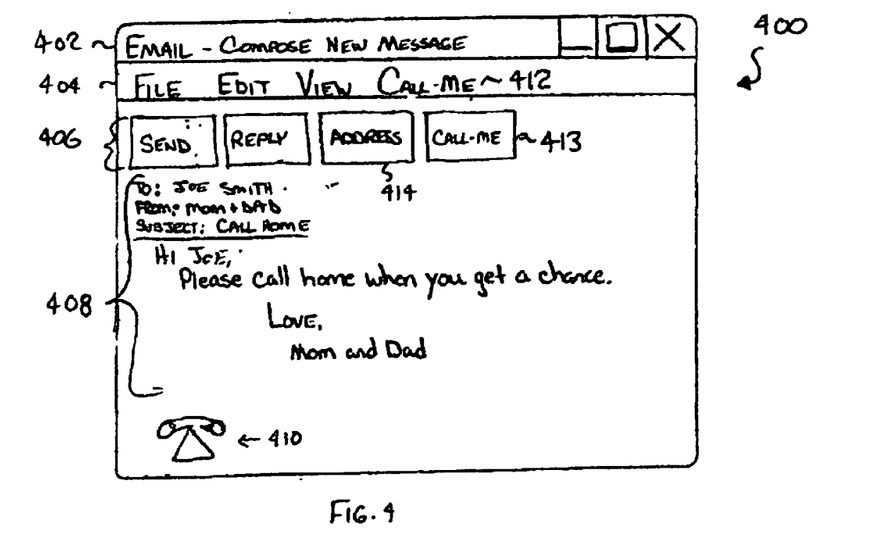
FIG. 4 is a graphical representation illustrating one embodiment of how an electronic token generated in accordance with the teachings of the present invention, may be displayed in association with an electronic mail message.

FIG. 4 is a graphical representation illustrating on embodiment of an email application in accordance with the teachings of the present invention. Email application 400 is shown including window title bar 402, window menu bar 404, action buttons 406, email message 408, and offer icon 410. Email application 400 represents any of the various electronic mail applications known in the art including, but not limited to Outlook, available from Microsoft Corp., and Notes, available from IBM Corp., of Armonk, N.Y., whereas email message 408 represents a text-based message generated by email application 400. Alternatively, email message 408 may be generated by a web-based email account accessed through a generic web-browser.

Except for the teachings of the present invention, window title bar 402, window menu bar 404, and action buttons 406 are WINDOWS™ operating system features known in the art. In one embodiment of the invention, email application 400 includes one or more application specific menu bar entries, and/or one or more application specific action buttons, to facilitate generation of the electronic token. For example, selecting "call-me" menu entry 412, or activating "call-me" button 413 may cause one or more data input dialogs, such as those described above with respect to FIGS. 3(a–f), to be displayed. Additional ones of action buttons 406 may provide further functionality with respect to the electronic token generation and call placement services of the present invention. For example, when activated, address button 414 causes an address book to be displayed on the desktop. In one embodiment, the address book is stored locally on the client computer, whereas in an alternative embodiment, the address book is stored on a remote server, such as web server 128. In one embodiment, address data and contact information displayed in association with action buttons 406 and/or menu bar 404 is used in the generation of the electronic token of the present invention.

Email application 400 also includes email message 408 and offer icon 410. Email message 408 represents an electronic mail message including address information to route email message 408 to its designated destination as well as message text. Offer icon 410 is a graphical representation of an offer to participate in a voice call that has been attached to email message 408 by, for example, an offeror, such as the mother and father of the previous example. In an alternative embodiment, offer icon 410 is a text-based representation, such as a uniform resource locater (URL), rather than a graphical representation.

Figure 5:
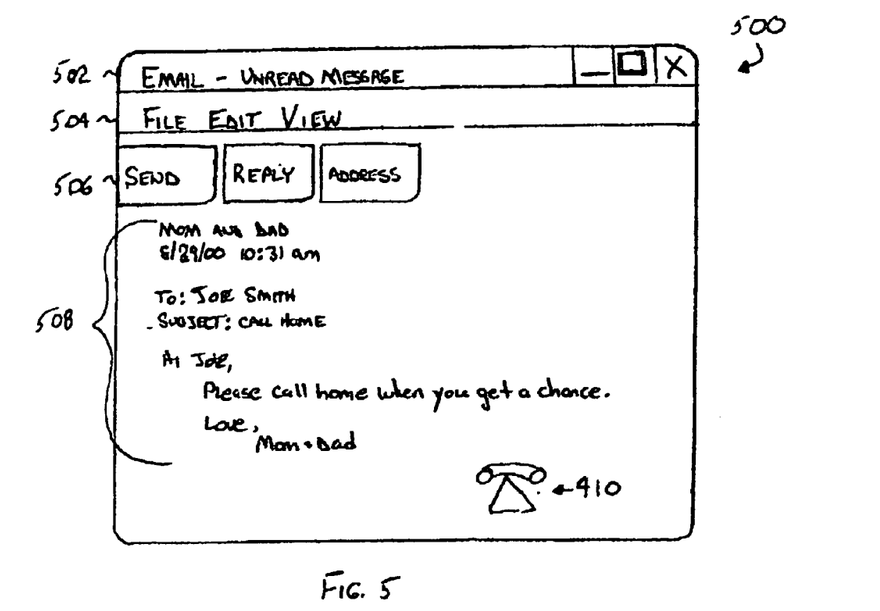
FIG. 5 is a graphical representation illustrating one embodiment of how a received electronic mail message may be displayed in accordance with the teachings of the present invention.

FIG. 5 is a graphical representation illustrating one embodiment of how a received electronic mail message may be displayed in accordance with the teachings of the present invention. Email message 500 is shown including window title bar 502, window menu bar 504, action buttons 506, message body 508, and offer icon 510. Except for the teachings of the present invention, window title bar 302, and window menu bar 304 are features of the WINDOWS™ operating system. Action buttons 506 represent graphical images that are each linked to a generic email feature or function depending upon the specific email application utilized. In one embodiment, action buttons 506 include a button that when selected by a user, cause one or more data input dialogs to be presented, such as those described above with respect to FIGS. 3(a–f).

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer system comprising:
   a storage medium having stored therein a plurality of programming instructions to implement a set of communication services on the computer system for generating on behalf of an offeror client, an electronic token representing an offer to participate in a voice call with a destination party designated by the offeror client and including a telephone number or an IP address of said destination party and a telephone number or an IP address of an offeree provided by said offeror for generating said electronic token, the electronic token to be transmitted by the offeror client in association with an electronic mail message to said offeree, services for receiving on behalf of the offeror client, through a data network link, a notification from the offeree denoting the offeree's acceptance of the offeror client's offer by activating said electronic token, and services for causing, immediately in response to the offeree's acceptance of the offeror client's offer, a first voice call connection to be initiated to the destination party designated by the offeror client and a second voice call connection to be initiated to the offeree, and bridging together the two connections so as to establish a voice call between the destination party and the offeree; and
   an execution unit coupled to the storage medium for executing the plurality of programming instructions.

2. The computer system of claim 1, wherein the offeree accepts the offeror client's offer by activating the electronic token.

3. The computer system of claim 2, wherein activating the electronic token comprises selecting the electronic token with a user input device.

4. The computer system of claim 2, wherein the electronic token comprises a graphical icon.

5. The computer system of claim 2, wherein the electronic token comprises an URL.

6. The computer system of claim 1, wherein the voice call comprises at least one of a circuit switched call and a packet based call.

7. The computer system of claim 1, wherein the destination party designated by the offeror client is the offeror client.

8. The computer system of claim 1, wherein the first and second voice calls each comprise a circuit switched call.

9. The computer system of claim 1, wherein the first voice call comprises a circuit switched call and the second voice call comprises a packet based call.

10. The computer system of claim 1, wherein the first voice call comprises a packet based call and the second voice call comprises a circuit switched call.

11. The computer system of claim 1, wherein the first and second voice calls each comprise a packet based call.

12. The computer system of claim 1, wherein the electronic token is generated on behalf of the offeror client based at least in part upon data provided to the computer system by the offeror client.

13. The computer system of claim 1, wherein the telephone number or IP address of said destination party in said electronic token is obscured to prevent the offeree from identifying it.

14. The computer system of claim 1, further comprising programming instructions to implement services for receiving payment information from the offeror client in association with at least one of the first and second calls, and services for verifying the ability of the offeror client to pay an indicated amount, prior to causing the first and second voice calls to be bridged.

15. A method comprising:
   transmitting by an offeror party in association with an electronic mail message, an electronic token representing an offer to participate in a voice call with a destination party and including an PSTN extension or a data network address of said destination party and a PSTN extension or a data network address of an offeree party provided by said offeror party for generating said electronic token;

receiving by said offeree party, the electronic token representing the offer to participate in the voice call with the destination party;

receiving on behalf of the offeror party, through a data network link, a notification from the offeree denoting the offeree's acceptance of the offeror party's offer by activating said electronic token; and causing, immediately in response to the offeree's acceptance of the offeror client's offer, a first voice call connection to be initiated to the destination party designated by the offeror client and a second voice call connection to be initiated to the offeree; and bridging together the two connections so as to establish a voice call between the destination party and the offeree.

16. The method of claim 15, wherein the offeree party accepts the offer to participate in the voice call by activating the electronic token representing the offer.

17. The method of claim 16, wherein activating the electronic token includes selecting the electronic token with a user input device.

18. The method of claim 16, wherein the electronic token comprises a graphical icon.

19. The method of claim 16, wherein the electronic token comprises an URL.

20. The method of claim 15, wherein the destination party is the offeror party.

21. The method of claim 15, wherein the voice call comprises at least one of a circuit switched call and a packet based call.

22. The method of claim 15, wherein both the first and second voice call connections are PSTN call connections.

23. The method of claim 15, wherein the first voice call connection is a VOIP call connection, and the second voice call connection is a PSTN call connection.

24. The method of claim 15, wherein the first voice call connection is a PSTN call connection, and the second voice call connection is a VOIP call connection.

25. The method of claim 15, wherein both the two voice call connections are VOIP call connections.

26. The method of claim 15, wherein the electronic token is generated by a third party based at least in part upon data provided to the third party by the offeror party in association with a contractual relationship previously established between the third party and the offeror party.

27. The method of claim 26, wherein the data provided to the third party by the offeror party includes said PSTN extension or data network address of the destination party.

28. The method of claim 27, wherein said PSTN extension or data network address is obscured to prevent the offeree party from identifying it.

29. The method of claim 26, wherein the data provided to the third party includes billing information.

30. The method of claim 29, wherein the voice call is bridged only after payment verification is received by the third party from an independent party assuring that the offeror party will pay for the cost of the call.

31. A computer system comprising:

a storage medium having stored therein a plurality of programming instructions to implement a set of communication services on the computer system for receiving on behalf of an offeror client, through a data network link, a notification from an offeree denoting the offeree's acceptance of the offeror client's offer to participate in a voice call with a designated destination party, the offer communicated to the offeree by an electronic token in association with an electronic mail message and including a telephone number or an IP address of said destination party and a telephone number or an IP address of said offeree provided by said offeror client for generating said electronic token, and for causing immediately in response to the offeree's acceptance of the offeror client's offer by activating the electronic token, a first voice call connection to be initiated to the destination party designated by the offeror client and a second voice call connection to be initiated to the offeree, and bridging together the two connections so as to establish a voice call between the destination party and the offeree; and an execution unit coupled to the storage medium for executing the plurality of programming instructions.

32. The computer system of claim 31, wherein the destination party is designated by the offeror.

33. A computer system comprising:

a storage medium having stored therein a plurality of programming instructions to implement a set of communication services on the computer system for generating on behalf of an offeror client, an electronic token representing an offer to participate in a voice call with a designated destination party and including a telephone number or IP address of said destination party and a telephone number or an 1P address of an offeree provided by said offeror client for generating said electronic token, the electronic token to be transmitted to said offeree in association with an electronic mail message and services for causing immediately in response to the offeree's acceptance of the offeror client's offer by activating said electronic token, a first voice call connection to be initiated to the destination party designated by the offeror client and a second voice call connection to be initiated to the offeree, and bridging together the two connections so as to establish a voice call between the destination party and the offeree; and an execution unit coupled to the storage medium for executing the plurality of programming instructions.

* * * * *